US008161479B2

(12) United States Patent
Sedukhin et al.

(10) Patent No.: US 8,161,479 B2
(45) Date of Patent: Apr. 17, 2012

(54) SYNCHRONIZING VIRTUAL MACHINE AND APPLICATION LIFE CYCLES

(75) Inventors: Igor Sedukhin, Issaquah, WA (US);
Daniel Eshner, Issaquah, WA (US);
Robert M. Fries, Kirkland, WA (US);
Michael O. Neary, Kirkland, WA (US);
Alexander E. Nosov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 978 days.

(21) Appl. No.: 12/138,591

(22) Filed: Jun. 13, 2008

(65) Prior Publication Data

US 2009/0313620 A1 Dec. 17, 2009

(51) Int. Cl.
*G06F 9/445* (2006.01)
(52) U.S. Cl. .......................................................... 718/1
(58) Field of Classification Search ........................ None
See application file for complete search history.

(56) References Cited

U.S. PATENT DOCUMENTS

| 7,356,679 | B1* | 4/2008 | Le et al. ............................ 713/1 |
| 2004/0010788 | A1* | 1/2004 | Cota-Robles et al. ............ 718/1 |
| 2005/0005018 | A1 | 1/2005 | Datta |
| 2006/0026592 | A1* | 2/2006 | Simonen et al. .................. 718/1 |
| 2006/0070066 | A1 | 3/2006 | Grobman |
| 2006/0123416 | A1 | 6/2006 | Bertolotti |
| 2006/0184937 | A1 | 8/2006 | Abels et al. |
| 2007/0028244 | A1 | 2/2007 | Landis et al. |
| 2007/0038998 | A1 | 2/2007 | Fries |
| 2007/0078988 | A1 | 4/2007 | Miloushev et al. |
| 2007/0168956 | A1* | 7/2007 | Moore et al. .................... 717/120 |
| 2007/0239944 | A1 | 10/2007 | Rupanagunta et al. |
| 2007/0300069 | A1 | 12/2007 | Rozas |
| 2008/0034365 | A1 | 2/2008 | Dahlstedt |
| 2008/0134178 | A1 | 6/2008 | Fitzgerald |
| 2009/0037835 | A1* | 2/2009 | Goldman ......................... 715/771 |

FOREIGN PATENT DOCUMENTS

JP 2005208999 8/2005

OTHER PUBLICATIONS

"Virtualization, SaaS & SOA: Introducing Service Oriented Programming," Author Unknown, Feb. 24, 2008, 2 pgs. [online] [retrieved on Apr. 11, 2008]. Retrieved from the Internet: http://www.semantic-web.at/index.php?id=1&subid=57&action=resource&item=1705.

(Continued)

*Primary Examiner* — Robert Fennema
(74) *Attorney, Agent, or Firm* — Workman Nydegger (57) ABSTRACT

A virtual environment can be configured to coordinate life cycles of virtual machines and application programs executing therein. In one implementation, the virtual environment includes an application layer and a virtual machine layer. The application layer communicates with the virtual machine layer to coordinate and directs virtual machine creation and deletion in a coordinated fashion with application programs. For example, the application layer receives a request to initiate an application program. The application layer determines from associated application properties the type and/or number of virtual machines to be created. The application layer then directs creation of the appropriate virtual machines (through the virtual machine layer), and further directs installation of the requested application programs therein. When detecting removal of the application program from the created virtual machines, the application layer can automatically direct removal or decommissioning of the corresponding virtual machine.

20 Claims, 4 Drawing Sheets

OTHER PUBLICATIONS

"Oracle Fusion Architecture and Oracle Fusion Applications," An Oracle Technical White Paper, by George Demarest and Peter Heller, Oracle Corporation, Redwood Shores, California, Jan. 2006, 44 pgs. [online] [retrieved on Apr. 11, 2008]. Retrieved from the Internet: http://www.oracle.com/industries/financial_services/fusion-architecture-wp.pdf.

"Microsoft Operations Manager (MOM) 2005: Integrated for the Dell Scalable Enterprise," by Tim Abels, Dell Scalable Enterprise Technology Center, MOM 2005 Overview: Managing Windows and Virtualization, Chapter 2, Sep. 2006, 31 pgs. [online] [retrieved on Apr. 11, 2008]. Retrieved from the Internet: http://www.dell.com/downloads/global/power/morn_2005_dellse_abels_ch2.pdf.

"Data Center Automation and the Agile Enterprise, The emergence of application-ready, modular utility computing platforms" by Mark Sigal, date unknown, 4 pgs. [online] [retrieved on Apr. 15, 2008]. Retrieved from the Internet: http://www.afcom.com/afcomnew/popupfiles/agile_enterprise.html.

* cited by examiner

SYNCHRONIZING VIRTUAL MACHINE AND APPLICATION LIFE CYCLES

CROSS-REFERENCE TO RELATED APPLICATIONS

N/A

BACKGROUND

Background and Relevant Art

Conventional computer systems are now commonly used for a wide range of objectives, whether for productivity, entertainment, or the like. One reason for this is that, not only do computer systems tend to add efficiency with task automation, but computer systems can also be easily configured and reconfigured over time for such tasks. For example, if a user finds that one or more application programs are running too slowly, it can be a relatively straightforward matter for the user to add more memory (e.g., RAM), add or swap out one or more processors (e.g., a CPU, GPU, etc.). It may also be a straightforward matter to add or improve the current storage, or even add or replace other peripheral devices that may be used to share or handle the workload. Similarly, it can be relatively straightforward for the user to install or upgrade various application programs on the computer, including the operating system. This tends to be true in theory even on a large, enterprise scale.

In practice, however, the mere ability to add or replace physical computer hardware can often be daunting, particularly on a large scale, sometimes resulting in several hours of extra time to place and configure a new computer system (or upgrade of components). Fortunately, recent developments in virtual machine ("VM") technology have improved or eliminated many of these types of constraints. For example, a virtual machine comprises a set of electronic files that operate as an additional, unique computer system, albeit within the confines and resource limitations of another physical host computer system.

In addition, the set of files for each virtual machine can be easily configured and re-configured in terms of resource access, and there can be several different virtual machines installed on a single physical host. Furthermore, each virtual machine can access the host's resources at different levels. Still further, the number of virtual machines—and the resource allocations for each virtual machine—on any given host computer system can be changed from time to time with relative ease. The users of each virtual machine, however, tend to be immune from such changes, and are generally able to access and view each different virtual machine as though it were a separate and distinct physical computer system with its own resources. For at least these reasons, organizations are using virtual machine technology at higher and higher rates.

In addition, another advantage of virtual systems is that administrators can add almost as many virtual machines as needed at a moment's notice in order to run certain application programs. For example, a system administrator might determine a need some point to create one or more virtual machines to handle a database application in one network location, and determine a need to create another set of virtual machines to handle network and email traffic at another network location. Upon making the determination, the system administrator essentially creates the virtual machines where needed, and then configures the virtual machines for these applications. Such configurations can involve the system administrator (or, in some cases, a different application administrator) installing the relevant application programs on the new virtual machines. All of this provisioning and installation could occur within just a few hours from determining the initial needs.

Of course, the ease by which an administrator can establish and setup virtual machines to handle applications can result in other problems related to management of not only of virtual machines, but also of application programs running thereon. Specifically, an increasingly common problem is that organizations are often creating and using virtual machines more quickly than they can track. Due to the speed of virtual machine creation, any given administrator may be unaware just how many virtual machines are created at a given time, and which virtual machines are created for any particular physical host.

Similarly, there is often a record keeping disconnect that occurs in identifying which virtual machines are running, and which applications are running on the virtual machines. Conventional mechanisms for keeping track of such information generally involve administrators maintaining detailed logs (e.g., on a spreadsheet) about what they have created and what they have deleted or decommissioned. Not only can this be fairly onerous for large numbers of virtual machines and application programs, but there is often a lack of consistency between what administrators will create, and what the other administrators will enter into the log. This is particularly true of enterprise systems that may have a large number of administrators or users that are installing and using virtual machines.

Thus, it is not uncommon, particularly for large organizations, for a system administrator to keep track of a certain set of virtual machines on one set of physical hosts, but be unaware that another administrator has installed other applications on those virtual machines. If the administrator that initially created the virtual machine tries to delete or decommission the virtual machine, that administrator might receive an error message indicating that other applications are running on the virtual machine. The initial administrator might then leave the virtual machine alone. When the other administrator later removes the other application program that prevented deletion of the virtual machine, and fails to delete the virtual machine, the virtual machine may remain on the system almost indefinitely.

Thus, one will appreciate that the life cycle of a given application program often fails to coincide with the life cycle of a virtual machine. This is partly since there is little to ensure that an administrator will decommission or remove a virtual machine when the administrator has uninstalled the application program, and no longer needs the virtual machine. For these and other reasons, organizations that implement virtualization technology often run into a problem commonly known as "virtual machine sprawl" (or "VM sprawl.")

Essentially, virtual machine sprawl describes a situation in which an organization may be continually creating virtual machines, but is otherwise losing track of how the virtual machines are being used, and/or who may still be using the virtual machines. One will appreciate that virtual machine sprawl can create an unnecessary drain on the organization's resources. This drain occurs at least in part since the virtual machines that should be deleted may still be holding onto various hardware resources that cannot be used by other virtual machines. This drain also occurs at least in part since the organization's staff may need to expend a large number of resources to correctly identify the particulars of each virtual machine in the system, and determine whether the virtual machines are needed at all.

Accordingly, there are a number of difficulties with managing virtual machines in an organization that can be addressed. One will appreciate that such difficulties can be particularly acute when an organization is using distributed application programs that involve several components executing at several different virtual (and physical) machines.

BRIEF SUMMARY

Implementations of the present invention overcome one or more problems in the art with systems, methods, and computer program products configured to efficiently manage the creation, operation, and decommissioning of virtual machines in an organization. In one implementation, for example, a system comprises an application layer that coordinates and directs virtual machine creation and deletion through one or more virtual machine layers in response to requests to install or uninstall an application program. The application layer can further coordinate what is being installed and/or uninstalled through a common data structure that can be referenced by other executive applications operating in the system. As such, the application layer can ensure that virtual machine and application program life cycles coincide.

For example, a method from the perspective of an application layer can involve receiving one or more requests in an application layer to initiate an application program. The method can also involve determining from one or more properties of the requested application program which of one or more virtual machines should be deployed to execute the requested application program. In addition, the method can involve sending one or more virtual machine commands from the application layer to a virtual machine layer to deploy the determined one or more virtual machines for the requested application program. Furthermore, the method can involve installing the requested application program on the deployed one or more virtual machines.

In addition to the foregoing, a method from the perspective of the overall system of managing creation, operation and decommissioning of one or more virtual machines can involve receiving one or more requests at an application layer (103) to initiate an application program. The requested application program includes one or more properties that indicate the type and number of virtual machines to be used. The method can also involve reviewing one or more data structures in the application layer to identify one or more virtual machines that are available in the computerized environment. In addition, the method can involve instructing a virtual machine layer to install the requested application program on one or more of the available virtual machines that are installed at one or more physical hosts. Furthermore, the method can involve, upon identifying through the data structure that the requested application program has been uninstalled from a virtual machine, the application layer automatically directing removal of the virtual machine from a corresponding physical host.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to efficiently manage the creation, operation, and decommissioning of virtual machines in an organization. In one implementation, for example, a system comprises an application layer that coordinates and directs virtual machine creation and deletion through one or more virtual machine layers in response to requests to install or uninstall an application program. The application layer can further coordinate what is being installed and/or uninstalled through a common data structure that can be referenced by other executive applications operating in the system. As such, the application layer can ensure that virtual machine and application program life cycles coincide.

As will be appreciated more fully herein, implementations of the present invention can accomplish these and other ends with a software system that includes an application layer and a virtualization management layer (or "virtual machine layer"). These two layers have distinct responsibilities, and communicate with each other using unique dialog. One will appreciate that these and other components described herein can provide support for hybrid virtual and physical hardware environments, as well as concrete instantiation of the proposed software stack architecture. Specifically, implementations of the present invention can be used to provide a federated application platform over a federated virtual machine manager. This federated application platform, in turn, can be driven by one or more data structures that represent declarative models of applications and virtual environments.

For example, at least one method in accordance with an implementation of the present invention includes constructing virtual environments based on declarative models of an application. In addition, methods in accordance with an implementation of the present invention can comprise controlling lifecycle of virtual machines in a virtual environment coordinated with application lifecycles. In addition, such methods can include monitoring and managing applications running in virtual environments based on declarative models. As will be appreciated herein, such methods can be accomplished in virtually any operating environment, including virtual environments that are constructed on-premise or in "the cloud," (i.e., somewhere in a network), or where application modules run on-premise or in the cloud.

Figure 1A:
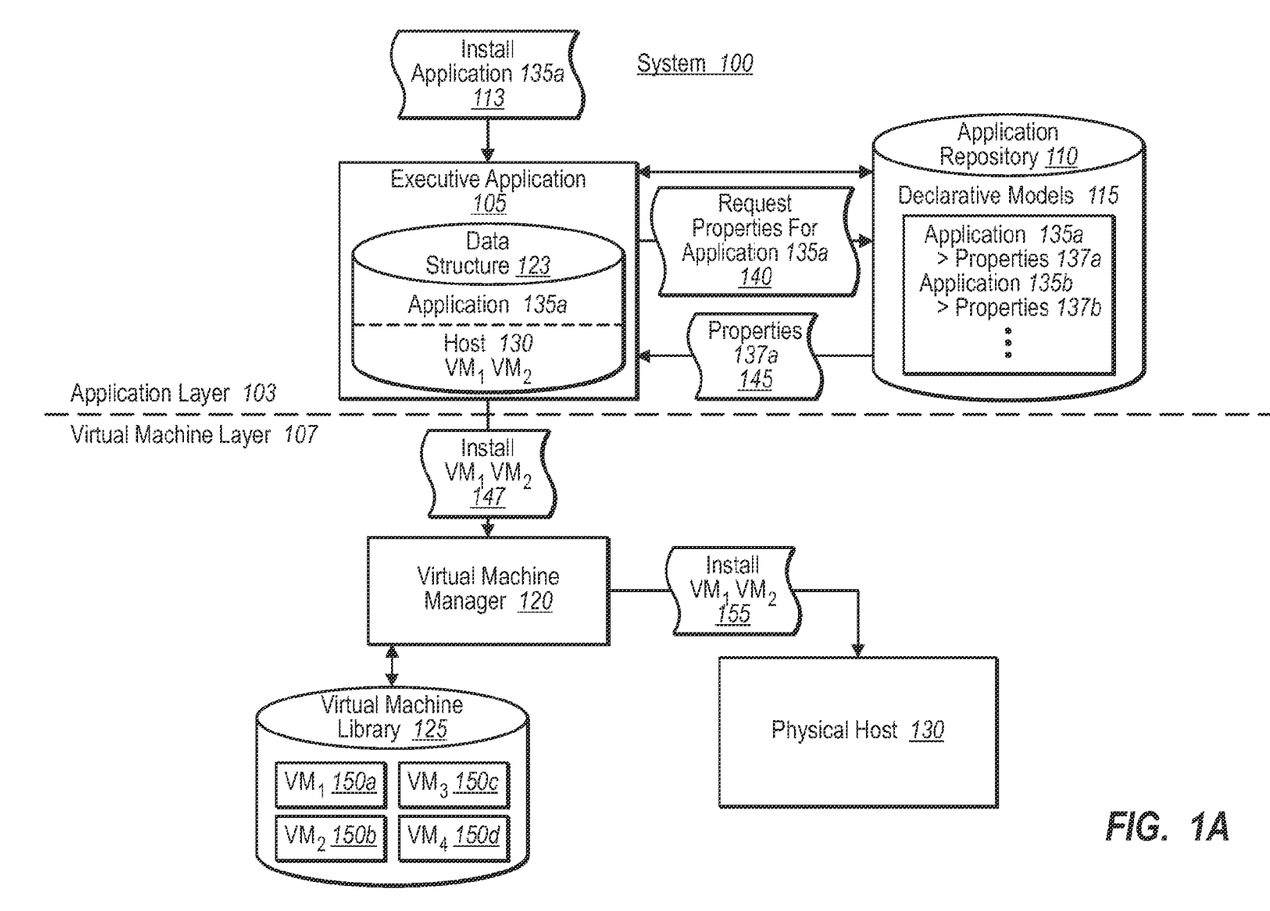
FIG. 1A illustrates an overview schematic diagram in which an application layer implements one or more application installation instructions with a virtual machine layer in accordance with an implementation of the present invention.

FIG. 1A illustrates an overview diagram of a system 100 that comprises an application layer 103 and a virtual machine layer 107, which work together to install and manage virtual machines in conjunction with applications. For example, FIG. 1A shows that an application layer 103 comprises at least an executive application 105. In general, executive application 105 comprises one or more sets of executable instructions that carry out various requests (e.g., to install an application) by executing a declarative model-described workflow. As understood more fully below, the executive application 105 receives information about a given application from the various declarative models 115, and refines this information into specific commands that are sent to various virtual machines.

For example, FIG. 1A shows that application layer 103 comprises an application repository 110. Application repository 110 further comprises a set of the aforementioned declarative models 115 that relate various applications 135 with corresponding properties 137, including various "intents" for the application. Such application intents (i.e., in properties 137) in the declarative models 115 can include various hardware and virtual machine specifications for each application 135, as well as application lifecycle information. In particular, the intents of a given declarative model 115 for an application program can include the kinds of virtual machines (e.g., specifically configured virtual machine templates, or even existing virtual machines) that may be required for a given application 135 to run, in addition to the number of virtual machines that can or should be used. For example, if the requested application 115 were a distributed application, the declarative intents might specify several different virtual machines (and even types of virtual machines), and several different physical hosts (or types of physical hosts) for each component of the distributed application. Such declarative model intents can also include various lifecycle information about a given application program, such as a maximum time interval during which the application can execute before being installed.

In addition, FIG. 1A shows that the application layer 103, via executive application 105, can comprise one or more common data structures 123. In general, the one or more common data structures 123 are accessible by a wide range of components (including other executive applications in the system). The common data structures 123 store and relate status information about applications and virtual machines installed in the system 100. In at least one implementation, for example, data structure 123 indicates where and when various application programs have been installed (physical and/or network locations), as well as where and when various virtual machines have been installed (physical and/or network locations). As previously mentioned, data structure 123 can further include information about application and/or virtual machine lifecycles that the executive application 105 has refined/determined from the declarative models 115. Since data structure 123 is commonly accessible to a wide number of components, data structure 123 can be referenced and updated by a number of different components in both the application layer 103 and virtual machine layer 107, in order to help maintain consistency.

Referring again to the figures, FIG. 1A shows that virtual machine layer 107 can comprise one or more virtual machine managers 120. Virtual machine manager 120, in turn, comprises one or more sets of executable instructions for installing and uninstalling virtual machines, as well as allocating resources of the virtual machines on a given host. Virtual machine manager 120 also monitors performance of each virtual machine on the physical host. For example, when virtual machine manager 120 installs a given virtual machine, the virtual machine manager 120 also installs one or more monitoring agents that provide feedback to the virtual machine manager 120. Such feedback can include the nature of assigned resource usage (e.g., whether the processor and memory assignments are sufficient), as well as how the various application programs installed therein are running.

In addition, FIG. 1A shows that virtual machine manager 120 can be configured to communicate with one or more virtual machine libraries 125. In general, a virtual machine library 125 consists of one or more virtual machine templates 150 that each represents a "hot standby," which the virtual machine manager 120 can copy over and install onto a given physical host (e.g., 130). For example, FIG. 1A shows that virtual machine library 125 comprises storage for virtual machines "VM$_1$" 150a, "VM$_2$" 150b, "VM$_3$" 150c, and "VM$_4$" 150d. Each of these virtual machines 150(a-d), in turn, can be particularly configured to work with certain types of applications, and even particular versions of applications. For example, virtual machines 150a and 150b may be particularly configured (in terms of resource assignments/requirements) to operate with particular versions of database applications, while virtual machines 150c and 150d may be particularly configured (in terms of resource assignments/requirements) to work with other versions of database applications, or, alternatively with internet applications.

In any case, each of the above-described components in system 100 are configured to work together to ensure that applications and virtual machines are installed together, and uninstalled together as part of the same lifecycles. In at least one implementation, this coordination is generally handled through the application layer 103 via executive application 105. For example, FIG. 1A shows that application layer 103 receives one or more requests/instructions 113 to install an application (i.e., application 135a), and this request 113 is received by executive application 105. In response, executive application 105 sends one or more requests 140 within the application layer 103 to determine how the request should be handled. For example, FIG. 1A shows that executive application 105 sends one or more requests to application repository 110 to identify properties intended or otherwise associated the requested application. Specifically, FIG. 1A shows that executive application 105 sends request 140, which requests properties associated with application 135a.

Application repository 110, in turn, identifies one or more declarative models 115 associated with the requested application 135a. For example, FIG. 1A shows that application repository 110 includes storage for declarative models 115, which associates properties 137a and 137b with applications 135a and 135b. These properties state various declarative intents about each application program 135. Such declarative intents can include the length application program should run, the number and/or type of virtual machines should be installed to handle the application. Such declarative intents can also include such information as the various network (or physical) locations where the application program should be executed. For example, an administrator may designate some applications only to be executed on secured servers and/or in secure network locations.

In either case, upon receiving request 140, FIG. 1A shows that application repository 110 responds with one or more messages 145 back to executive application 105. Executive application 105 can then interpret or "refine" the properties 137*a* received from repository 110, and store them as a set of corresponding instructions/commands in one of the one or more common data structures 123. In general, refinement in this context means progressively elaborating details from the received information from repository 110, such as by adding data to the declarative model (e.g., received from properties 137*a* in message 145), and writing the added data to data structure 123. As understood more fully herein, refinement elaborates details until the declarative model is sufficiently specific to be understood and translated by a particular virtual machine driver.

In at least one implementation, the properties 137 that correspond to the application's declarative models might include information indicating that the particular application 135*a* is ideally installed on two different virtual machines, and that these virtual machines should be configured for database usage. FIG. 1A thus shows the data structure 123 includes at least an indication that application 135*a* should be installed on virtual machines 150*a* and 150*b*. In addition, properties 137*a* can also include a preference for executing the application program 135*a* on a particular physical host. Thus, for example, FIG. 1A also shows that data structure 125 indicates that application 135 should be installed on physical host 130.

Upon determining the various properties and instructions for the requested application program, the application layer 103 can then send one or more instructions to the virtual machine layer 107 to install the appropriate virtual machines. For example, FIG. 1A shows that executive application 105 sends one or more instructions 147 that correspond to the refined information stored in data structure 123 to virtual machine layer 107. Specifically, FIG. 1A shows that instructions 147 include one or more requests to install virtual machines 150*a* ("VM$_1$") and 150*b* ("VM$_2$"), and that virtual machine manager 120 within virtual machine layer 107 receives these instructions.

The virtual machine layer 107 then performs the requests. For example, FIG. 1A shows that virtual machine manager 120 coordinates with the virtual machine library 125 to identify the requested templates to be installed, in this case, virtual machines 150*a* and 150*b*. In addition, FIG. 1A shows that virtual machine manager 120 sends one or more requests 155 to physical host 130 to install virtual machines 150*a* and 150*b*. In at least one implementation, the virtual machine layer 107 (e.g., via virtual machine manager 120) further communicates back to the application layer 103 (e.g., to executive application 105) with one or more messages (not shown) that indicates that the virtual machine installation and configuration is now complete.

For example, virtual machine manager 120 can pass installation confirmation information (not shown) directly into data structure 123. Executive application 105 can then read the data structure 123 as part of a period review, or in response to some signal that data structure 123 has been updated. Executive application 105 then identifies that the requested virtual machines have completed installation. In other cases, virtual machine manager 120 passes this information directly to executive application 105, which then enters this information into data structure 123. In either case, the information provided by virtual machine manager can include not only the mere fact of installation on host 130, but also other relevant information such as virtual machine names and network addresses.

Figure 1B:
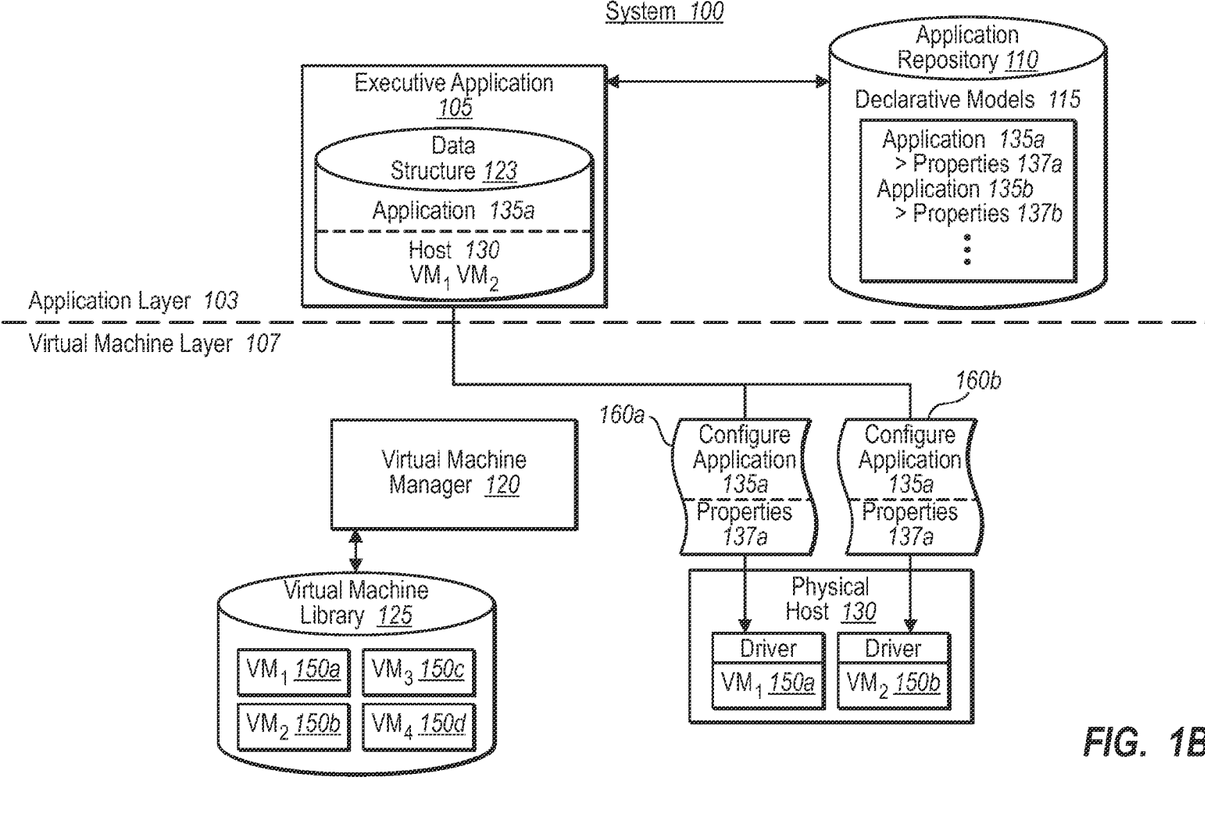
FIG. 1B illustrates the schematic diagram of FIG. 1A in which the application layer installs or configures the requested applications in one or more virtual machines set up by the virtual machine layer.

Upon confirming installation/deployment of the requested virtual machines, the application layer 103 can then install and configure the requested application(s) through the virtual machine layer 107. To this end, FIG. 1B shows that executive application 105 communicates directly with the drivers of the deployed virtual machines 150 at host 130. For example, executive application 105 can use the information provided by virtual machine manager 120, such as virtual machine names and network addresses to locate and identify the appropriate virtual machine drivers.

In addition, FIG. 1B shows that the application layer 103 (via executive application 105) sends one or more messages/instructions 160*a* and 160*b* to virtual machine layer 107. The drivers of the correspondingly addressed virtual machines 150*a* and 150*b* then receive messages 160*a* and 160*b* at physical host 130. In general, messages 160*a* and 160*b* can comprise not only application installation instructions for the requested application 135*a*, but also instructions related to the properties 137*a* previously received from application repository 110. For example, messages 160*a* and 160*b* can comprise particularly translated/refined declarative intent information in the form of specific commands about the lifecycle of the application, how the application should be executed in the virtual machine, and also any monitoring information.

The drivers for each virtual machine 150(*a-b*), in turn, translate and/or implement these commands (160) for the corresponding application containers (not shown) in the virtual machine. Specifically, the illustrated virtual machine drivers translate sufficiently detailed declarative models into imperative actions to be performed in the virtual machine. These translated instructions, in turn, control and configure application containers and application modules in the installed virtual machines 150 according to the intent declared in the model (e.g., via properties 137).

Along these lines, one will appreciate that translation by the drivers can take into account knowledge of particulars of an application container implementation and its current configuration. In one implementation, therefore, the virtual machine drivers can further communicate with executive application 105 to request any additional model data (e.g., that may be stored in data structure 123). For example, the virtual machine 150 drivers might request model data relevant to their translation work, and only before completing the command(s). The virtual machine drivers can also instrument application modules, and their application containers, to emit events regarding their behavior and changes in the environment as declared in the model.

The information provided by the virtual machine drivers can include not only health information related to the installed application 135*a* and/or virtual machine 150(*a-b*), but also information regarding application termination events. For example, the virtual machine drivers can send one or more messages to executive application 105 when an application is being uninstalled, has been uninstalled, or is about to be uninstalled at host 130. The information provided by the virtual machine drivers can, in turn, be received and stored in data structure 123. For example, the virtual machine 150 drivers sends one or more such messages directly to data structure 123, or to executive application 105, which then updates data structure 123 accordingly. In either case, the application layer 103, via executive application 105, can thus identify when it needs to begin decommissioning the corresponding virtual mahines(s).

Figure 1C:
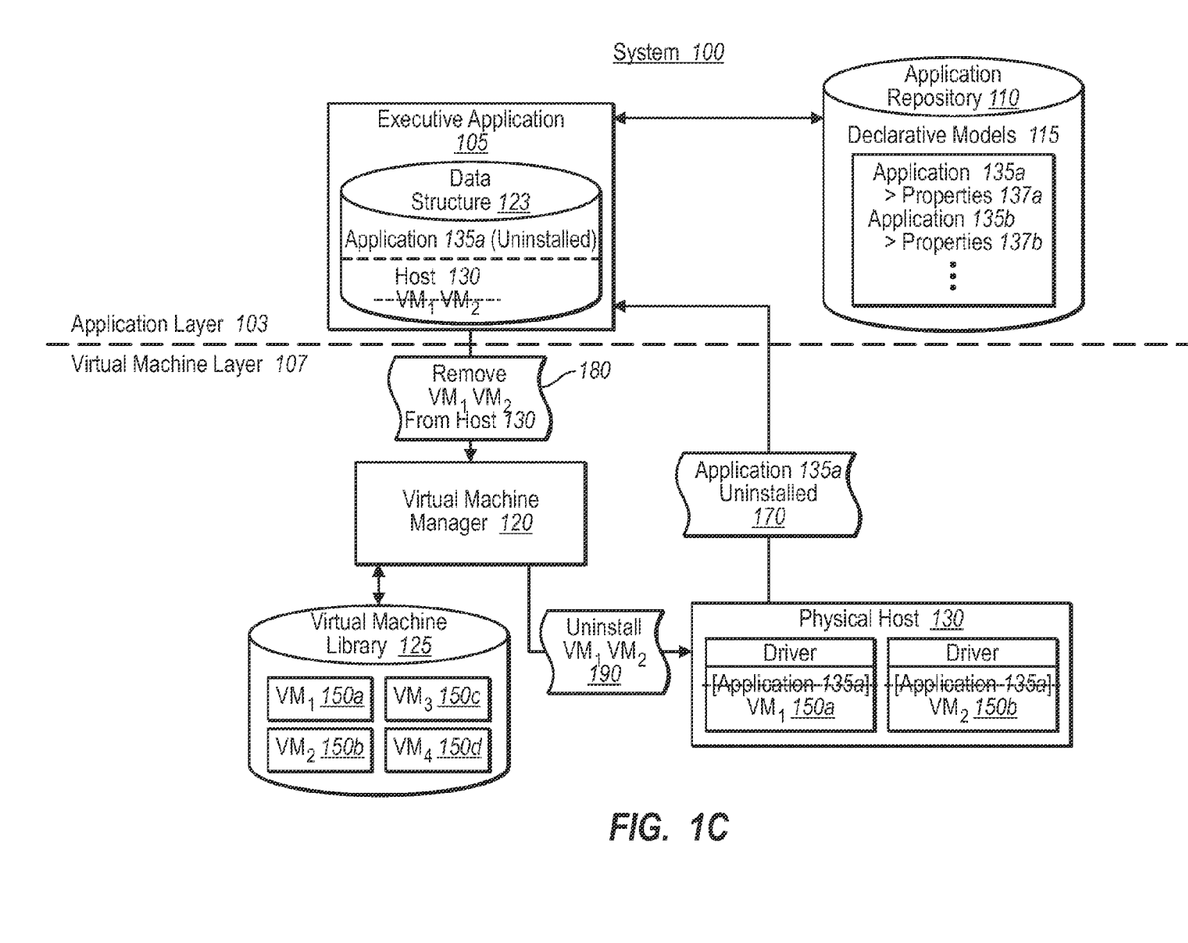
FIG. 1C illustrates an overview schematic diagram in which the application layer identifies that the previously installed application has been uninstalled and thus, removes the corresponding virtual machines through the virtual machine layer.

For example, FIG. 1C illustrates what can occur when a particular application program has been uninstalled from a virtual machine 150. In particular, when an application program is uninstalled, FIG. 1C shows that the virtual machine layer 107 (e.g., via the drivers at physical host 130) sends one or more messages 170 to the application layer 103 to indicate that application 135a is to be uninstalled, or has been uninstalled. As previously mentioned, for example, physical host 130 can pass message 170 directly to data structure 123, while, in alternative implementations, physical host 130 sends message 170 to executive application 105 directly. In either case, data structure 123 is ultimately updated to reflect the application removal. For example, FIG. 1C shows that data structure 123 comprises information that application 135a has now been uninstalled. Since, in this example, application 135a was the only application installed at virtual machine 150a and 150b, the application layer 103, via executive application 105, thus determines that virtual machines 150a and 150b now need to be deleted from physical host 130, as they are no longer being used.

Accordingly, FIG. 1C shows that the application layer 103, via executive application 105, sends one or more messages 180 to virtual machine layer 107. As before, virtual machine manager 120 then receives the messages 180 in the virtual machine layer 107. In the illustrated example, messages 180 include instructions to remove virtual machines 150a and 105b (i.e., "VM$_1$" and "VM$_2$") from the one or more physical hosts on which they are installed, in this case physical host 130. In response, the virtual machine layer 107 then performs any actions necessary to remove and confirm removal of the virtual machines. For example, FIG. 1C shows that virtual machine manager 120 sends one or more corresponding messages 190 to physical host 130, which messages instruct physical host 130 to remove or uninstall virtual machines 150a and 150b.

One will appreciate that there are a number of ways and mechanisms for "removing" or "decommissioning" a virtual machine (150b). For example, any given virtual machine can be set to or stored based on a prior "checkpoint." In general, a checkpoint represents a particular point-in-time state of the operating system (or other set of file structures in the virtual machine). For example, each time a user applies an operating system patch to the virtual machine, the virtual machine (or administrative component running or storing the virtual machine) might store this particular file state as a checkpoint.

Furthermore, the virtual machine (or administrative component running or storing the virtual machine) might maintain several different checkpoints for a given virtual machine. Thus, for example, some of the virtual machines in virtual machine library 125 could be differentially set up, not only in relation to particular application configurations, but also based on various checkpoints for applying operating system patches or upgrades. Similarly, the virtual machines 150a-b that are installed at physical host 130 may have also undergone several different checkpoint updates, some of which may be particularly applicable to executing application 135a.

As a result, in some cases, an administrator may choose to "remove" or "decommission" a particular version of the virtual machine 150a-b at physical host 130 when removing application 135a by either removing the virtual machine altogether, or merely reverting the virtual machine to a particular checkpoint. In such a case, the instructions 190 sent from virtual machine 120 could alternately or additionally include instructions to revert virtual machines 150a-b to a prior checkpoint that may be more broadly applicable to other application programs that could be later installed at physical host 130.

One will appreciate that keeping the earlier versions of virtual machines 150a-b on physical host 130 could save resources that might be needed at a later point for copying an entire virtual machine 150 from library 125 back to physical host 130. Of course, however removed or decommissioned (i.e., full removal, or reversion to a particular checkpoint), the system 100 is configured to ensure that data structure 123 is able to maintain the relevant information so that the system 100 never loses track of the state or presence of a particular virtual machine and application.

For example, FIG. 1C further shows that, upon removing or decommissioning/uninstalling/reverting the virtual machines, physical host 130 can then send one or more confirmation messages. In particular, the virtual machine layer 107 confirms to the application layer 103 that removal (i.e., deletion, decommissioning, or reversion) of the virtual machines has been completed. For example, physical host 130 can send one or more confirmation messages back to virtual machine manager 120, which then communicates such information to the application layer 103. That is, virtual machine manager 120 can update data structure 123 with the removal (deletion or reversion) information, or otherwise send a corresponding communication to executive application 105, which then updates data structure 123 regarding the same. In additional or alternative implementations, physical host 130 communicates directly to data structure 123, and/or to executive application 105 to confirm removal (deletion or reversion) of the virtual machines 150(a-b).

Accordingly, FIG. 1A through 1C illustrate a variety of components, mechanisms and schematics for coordinating the lifecycles of application programs from virtual machines. One will appreciate that any or all of the above-described processes can be performed automatically, thus allowing accurate record keeping and management of virtual machines and application programs to occur with minimal administrative overhead.

Figure 2:
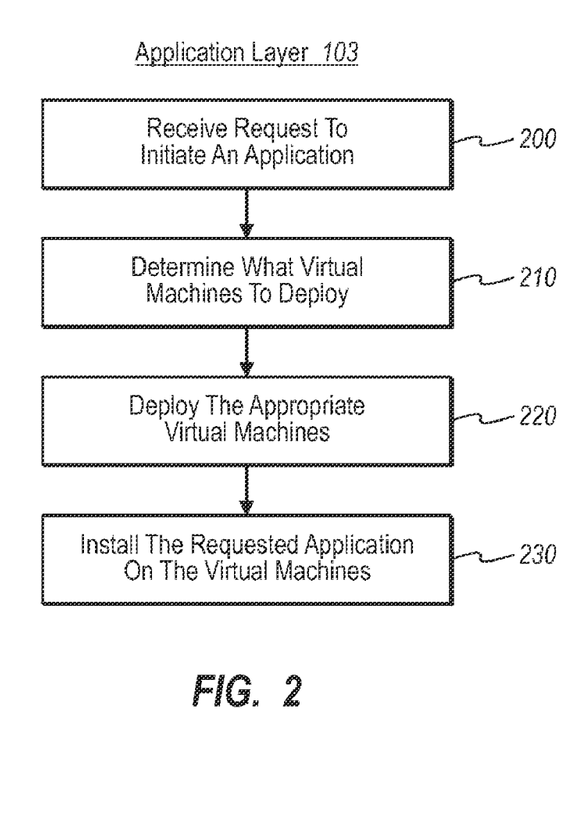
FIG. 2 illustrates a flow chart from the perspective of an application layer for installing virtual machines that correspond to a requested application.
Figure 3:
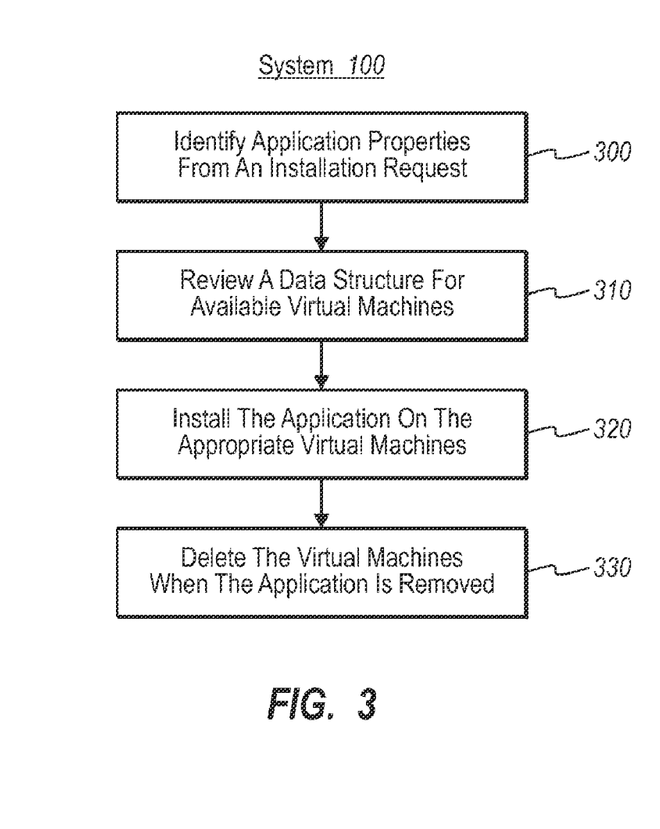
FIG. 3 illustrates a flow chart of a method from the perspective of the overall system for coordinating the lifecycle of an application with a virtual machine.

In addition to the foregoing, implementations of the present invention can also be described in terms of flow charts comprising one or more acts in a method for accomplishing a particular result. For example, FIG. 2 illustrates a flow chart from the perspective of executive application 105 for using a single application to install both virtual machines and application programs at a physical host, while FIG. 3 illustrates an alternative flow chart from the perspective of a system 100 for coordinating the installation and lifecycles of application programs and virtual machines. The acts of FIGS. 2 and 3 are described more fully below with respect to components and diagrams of FIG. 1A through 1C.

For example, FIG. 2 illustrates that a method from the perspective of executive application 105 can comprise an act 200 of receiving a request to initiate an application. Act 200 includes receiving one or more requests in an application layer to initiate an application program. For example, FIG. 1A shows that application layer 103, via executive application 105, receives installation instructions 113, which include one or more requests to install application program 135a.

FIG. 2 also shows that the method can comprise an act 210 of determining what virtual machines to deploy. Act 210 includes determining from one or more properties of the requested application program which of one or more virtual machines should be deployed to execute the requested application program. For example, FIG. 1A shows that executive application 105 communicates with application repository 110, and exchanges messages 140 and 145 to identify the properties for the requested application 135a. These properties 137a relate various declarative intents of declarative models 115 that correspond to the requested application 135a. In addition, the executive application 105 refines and/or translates the received properties 137a into specific instructions that are then maintained in data structure 123. In one implementation, the translation of these commands includes the number and type of virtual machines 150 to be installed for executing the requested application 135a.

In addition, FIG. 2 shows that the method from the perspective of executive application 105 can comprise an act 220 of deploying the appropriate virtual machines. Act 220 includes sending one or more requests from the application layer to a virtual machine layer to deploy the determined one or more virtual machines for the requested application program. For example, FIG. 1A shows that executive application 105 in the application layer 103 sends one or more messages 147 to virtual machine manager 120 in the virtual machine layer 107. As shown in FIG. 1A, instructions 147 include one or more requests to install the identified virtual machines 150a and 150b.

Furthermore, FIG. 2 shows that the method can comprise an act 230 of installing the requested application on the virtual machine. Act 230 includes installing the application program of the deployed one or more virtual machines. For example, as shown in FIG. 1B, once virtual machines 150a and 150b have been installed by virtual machine manager 120 at physical host 130, the application layer 103, via executive application 105, sends one or more messages 160a and 160b to the corresponding virtual machine layer 107 via virtual machine 150 drivers. The virtual machine drivers, in turn, instruct installation and configuration of the requested application 135a in accordance with properties 137a.

In addition to the foregoing, FIG. 3 illustrates that an additional or alternative method from the perspective of the overall system 100 in accordance with an implementation of the present invention can comprise an act 300 of identifying application properties for an installation request. Act 300 includes receiving one or more requests at an application layer to initiate an application program, wherein the requested application program comprises one or more properties that indicate the type and number of virtual machines to be used. For example, FIG. 1A shows that upon receiving installation request 113, executive application 105 and application repository 110 in the application layer 103 communicate to receive properties 137a that are related to the requested application 135a. As previously discussed, the properties 137a can include a variety of types of information about the requested application program 135a, such as preferences for the type or location of physical host, and type, number, or resource requirements of the virtual machines that should be used to run the application program.

FIG. 3 also shows that the method from the perspective of executive application 105 can comprise an act 310 of reviewing a data structure for available virtual machines. Act 310 includes reviewing one or more data structures in the application layer to identify one or more virtual machines that are available in the computerized environment. For example, FIGS. 1A and 1B show that executive application 105 in the application layer 103 interprets and/or refines the received properties 137a to determine that application 135a should be installed on host 130 and within two different virtual machines, in this case virtual machines 150a and 150b.

In addition, FIG. 3 shows a method from the perspective of the executive application 105 can comprise an act 320 of installing the application on the appropriate virtual machines. Act 320 includes instructing a virtual machine layer to install the requested application program on one or more of the available virtual machines that are installed at one or more physical hosts. For example, as shown in FIG. 1A, application layer 103, via executive application 105, sends one or more messages 147 to virtual machine layer 107, via virtual machine manager 120. The illustrated messages 147 include instructions to install virtual machines 150a and 150b on physical host 130. FIG. 1A further shows that virtual machine layer 107 acts on the request in that virtual machine manager 120 sends one or more corresponding messages 155 to physical host 130. Messages 155, in turn, instruct physical host 130 to install the requested virtual machines 150a and 150b.

Furthermore, FIG. 3 shows that the method from the perspective of the executive application 105 can comprise an act 330 of deleting the virtual machine when the application is removed. Act 330 includes, upon the identifying through the data structure that the requested application program has been uninstalled from a virtual machine, the application layer directing removal of the virtual machine from a corresponding physical host. For example, as shown in FIG. 1C, application layer 103 receives message 170 into data structure 123, whether directly, or initially through executive application 105. Executive application 105 then identifies that application 135a has been uninstalled and thus, that virtual machines 150a and 150b need to be removed (i.e., deleted from physical host 130, or reverted to a prior version at physical host 130). Accordingly, the application layer 103, via executive application 105, sends one or more messages 180 to the virtual machine layer 107 to remove (i.e., delete or revert) virtual machines 150a and 150b from host 130.

Implementations of the present invention, therefore, provide a consistent and efficient approach to managing virtual machine sprawl. Specifically, the declarative model-driven approach described herein provides simplicity (and therefore, primarily, reduction in management costs) by abstracting and managing many different unique virtual machine configurations as composite applications. In particular, the platform/system described herein uses declarative models of composite applications to automatically create the appropriate virtual machine configurations to run a requested application, and to manage the lifecycle of virtual machines. Representing an arbitrary number of virtual machines as an operable application reduces provides significant efficiency gains in virtualization management.

In addition, one will appreciate that both the virtual machine layers and application layers described herein can be configured to support both on-premise and cloud deployments. As such, a virtual machine can be run on-premise, but can also be run in the cloud, and the application layer can deploy and run any various web services or database application modules on-premise, or can deploy and run application modules in the cloud. One will appreciate that such an approach enables agility, and reduces management costs associated with running business applications in virtually any organization.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing system having one or more physical hosts for executing virtual machines, a computer-implemented method for an application layer within the computer system to initiate and manage creation and operation of one or more virtual machines for one or more application programs through a virtual machine layer within the computing system, comprising the acts of:
   an executive application executing in an application layer of a computer system receiving one or more requests to install an application program within one or more virtual machines at a virtual machine layer of the computer system;
   in response to receiving the one or more requests, the executive application communicating with an application repository to determine one or more properties of the requested application program identified in the one or more requests, including properties identifying one or more configurations of virtual machines to which the requested application program can be deployed;
   based on the one or more properties, the executive application identifying one or more virtual machines available from a virtual machine library that should be deployed to execute the requested application program;
   subsequent to identifying the one or more virtual machines, the executive application automatically sending one or more virtual machine commands from the application layer to a virtual machine manager executing in the virtual machine layer, the one or more virtual machine commands instructing the virtual machine manager to deploy the identified one or more virtual machines from the virtual machine library for the requested application program;
   the executive application receiving one or more messages from the virtual machine manager indicating that the one or more virtual machines have been deployed;
   subsequent to receiving the one or more messages from the virtual machine manager, the executive application automatically sending one or more instructions to each of the one or more deployed virtual machines instructing each of the one or more deployed virtual machines to install the requested application program according to a configuration identified from the one or more properties.

2. The method as recited in claim 1, wherein the executive application translates the one or more properties into the one or more virtual machine commands.

3. The method as recited in claim 2, wherein:
   the one or more properties comprise one or more declarative models associated with the requested application program; and
   the one or more declarative models comprise the one or more configurations of virtual machines to which the requested application program can be deployed.

4. The method as recited in claim 3, wherein the one or more properties indicate one or more physical hosts on which the identified one or more virtual machines should be deployed.

5. The method as recited in claim 3, wherein the one or more properties indicate a number and type of virtual machines that should be deployed for the requested application program.

6. The method as recited in claim 5, wherein any or all of the number and type of virtual machines depend on a version of the requested application.

7. The method as recited in claim 4, further comprising an act of storing, in a data structure, an identification that the deployed one or more virtual machines are deployed at the one or more physical hosts.

8. The method as recited in claim 1, further comprising an act of, subsequent to the executive application sending the one or more instructions to each of the one or more deployed virtual machines instructing each of the one or more deployed virtual machines to install the requested application program, the executive application receiving an indication that the requested application has been uninstalled.

9. The method as recited in claim 8, further comprising the acts of, subsequent to the executive application sending one or more instructions to each of the one or more deployed virtual machines instructing each of the one or more deployed virtual machines to install the requested application program and prior to receiving the message from the virtual machine layer indicating that the requested application has been uninstalled from the one or more deployed virtual machines:
   the executive application identifying that the requested application should be uninstalled from the one or more deployed virtual machines; and
   the executive application sending one or more instructions to each of the one or more deployed virtual machines instructing each of the one or more deployed virtual machines to uninstall the requested application.

10. The method as recited in claim 9, wherein the act of identifying that the requested application should be uninstalled comprises identifying from one or more lifecycle properties that correspond to the requested application that the application is ready to be uninstalled or decommissioned.

11. The method as recited in claim 8, further comprising an act of the executive application sending one or more instructions from the application layer to the virtual machine manager executing in the virtual machine layer instructing the virtual machine manager to remove the deployed one or more virtual machines from any corresponding physical host.

12. The method as recited in claim 11, further comprising an act of updating a data structure to indicate that the previously deployed one or more virtual machines have been removed from the corresponding physical host.

13. The method as recited in claim 1, wherein the requested application program comprises a distributed application, and wherein the deployed one or more virtual machines for the requested application program comprise a plurality of virtual machines.

14. The method as recited in claim 1, wherein at least one driver for at least one deployed virtual machine provides the executive application with health information related to the installed application program at the at least one deployed virtual machine.

15. The method as recited in claim 1, wherein the method further includes storing, in one or more data structures, an identification of a correlation between the requested application program and the one or more deployed virtual machines and that the requested application has been installed on the one or more deployed virtual machines.

16. In a computing system having one or more processors, a computer-implemented method for an application layer within the computer system to initiate and manage creation, operation and decommissioning of one or more virtual machines along with one or more application programs, comprising the acts of:
   an executive application executing in an application layer of a computer system receiving one or more requests to install an application program within one or more virtual machines at a virtual machine layer of the computer system, wherein the requested application program comprises one or more properties that indicate the type and number of virtual machines to be used and an application configuration for use within the indicated type and number of virtual machines;
   in response to receiving the one or more requests, the executive application reviewing one or more data structures in the application layer to identify one or more virtual machines from a virtual machine library that are available for deployment within the virtual machine layer;
   based on the identification of the one or more virtual machines, the executive application automatically instructing a virtual machine manager executing in the virtual machine layer to deploy the identified one or more virtual machines from the virtual machine library at one or more physical hosts;
   the executive application receiving one or more messages from the virtual machine manager indicating that the identified one or more virtual machines have been deployed at the one or more physical hosts;
   the executive application automatically instructing each of the one or more deployed virtual machines to install the requested application program at the corresponding virtual machine according to the application configuration based on the deployment of the one or more virtual machines; and
   subsequently identifying through the one or more data structures that the requested application program has been uninstalled from at least one of the one or more deployed virtual machines, and in response the executive application automatically directing the virtual machine manager to remove the at least one deployed virtual machine from a corresponding physical host.

17. The method as recited in claim 16, wherein:
   the identified one or more virtual machines comprise one or more virtual machine templates set to an operating system checkpoint; and
   the virtual machine manager removing the at least one deployed virtual machine from the corresponding physical host, including reverting the at least one deployed virtual machine to a prior checkpoint, such that an updated version of the at least one deployed virtual machine is removed from the physical host, and an earlier version of the at least one deployed virtual machine corresponding to the prior checkpoint remains on the physical host.

18. The method as recited in claim 16, wherein the one or more data structures can be updated by one or more components in the application layer or the virtual machine layer.

19. The method as recited in claim 16, wherein the one or more data structures indicate all virtual machines that are deployed in the computer system, all application programs that are installed on the deployed virtual machines, and one or more properties that indicate an intended lifecycle for each of the installed applications and the deployed virtual machines.

20. A computer program product comprising one or more computer storage devices having stored thereon computer-executable instructions that, when executed, cause one or more processors in a computer system to perform a method for an application layer within the computer system to initiate and manage creation and operation of one or more virtual machines for one or more application programs through a virtual machine layer within the computing system, and wherein the method is comprised of the following acts:
   an executive application executing in an application layer of a computer system receiving one or more requests to install an application program within one or more virtual machines at a virtual machine layer of the computer system;
   based on the one or more requests, the executive application communicating with an application repository to determine one or more properties of the requested application program, including properties identifying one or more types of virtual machines that are available in a virtual machine library to which the requested application program can be deployed, one or more configurations of those virtual machines, and one or more configurations of the requested application program;
   based on the one or more properties, the executive application identifying one or more virtual machines available from a virtual machine library that should be deployed to execute the requested application program and one or more configurations of the one or more virtual machines;
   after identifying the one or more virtual machines, the executive application automatically sending one or more virtual machine commands from the application layer to a virtual machine manager executing in the virtual machine layer, the one or more virtual machine commands instructing the virtual machine manager to deploy the identified one or more virtual machines from the virtual machine library for the requested application program according the identified one or more configurations of the one or more virtual machines;

the executive application receiving one or more messages from the virtual machine manager indicating that the one or more virtual machines have been deployed;

responsive to the deployment of the one or more virtual machines, the executive application automatically sending one or more instructions to each of the one or more deployed virtual machines, instructing each of the one or more deployed virtual machines to install the requested application program according to the one or more configurations of the requested application program; and the executive application storing, in a data structure, an identification that the requested application program is installed on the one or more deployed virtual machines.

* * * * *